June 11, 1946.   R. M. HEINTZ   2,401,932
SLEEVE VALVE ENGINE
Filed Jan. 22, 1945   3 Sheets-Sheet 1

INVENTOR.
RALPH M. HEINTZ
BY
ATTORNEY

June 11, 1946.　　R. M. HEINTZ　　2,401,932
SLEEVE VALVE ENGINE
Filed Jan. 22, 1945　　3 Sheets-Sheet 2

INVENTOR.
RALPH M. HEINTZ
BY Frank H. Harmon
ATTORNEY

June 11, 1946.  R. M. HEINTZ  2,401,932
SLEEVE VALVE ENGINE
Filed Jan. 22, 1945  3 Sheets-Sheet 3

INVENTOR.
RALPH M. HEINTZ
BY
Frank H Harmon
ATTORNEY

Patented June 11, 1946

2,401,932

UNITED STATES PATENT OFFICE 2,401,932

SLEEVE VALVE ENGINE

Ralph M. Heintz, Cleveland, Ohio, assignor, by mesne assignments, to Jack & Heintz Precision Industries, Inc., Cleveland, Ohio, a corporation of Delaware Application January 22, 1945, Serial No. 573,824

6 Claims. (Cl. 123—80)

This invention relates in general to rotary sleeve valve internal combustion engines and has for one of its objects to provide an improved multiple port system for intake and exhaust that will provide for a greater number of combined intake and exhaust ports leading to the intake and exhaust manifolds than the number of ports in the rotary sleeve valve itself.

One of the primary objects is to provide such a system as above mentioned that will insure a more efficient charge of intake combustible gases by an improved design of intake and exhaust ports so correlated with respect to the rotary sleeve valve that all of a greater number of intake ports are open during the intake stroke than all of the exhaust ports which are open during the exhaust stroke of the engine.

Another object is to further enhance the efficiency of the charge by allowing for a predetermined small degree of overlap during the last stages of the exhaust stroke during which the intake ports are beginning to open, such overlap, of course, being correlated also to the timing cycle of fire.

With the foregoing and other objects in view the invention resides in the combination of parts and in the details of construction set forth in the following specification and appended claims, certain embodiments thereof being illustrated in the accompanying drawings, in which:

Figure 1:
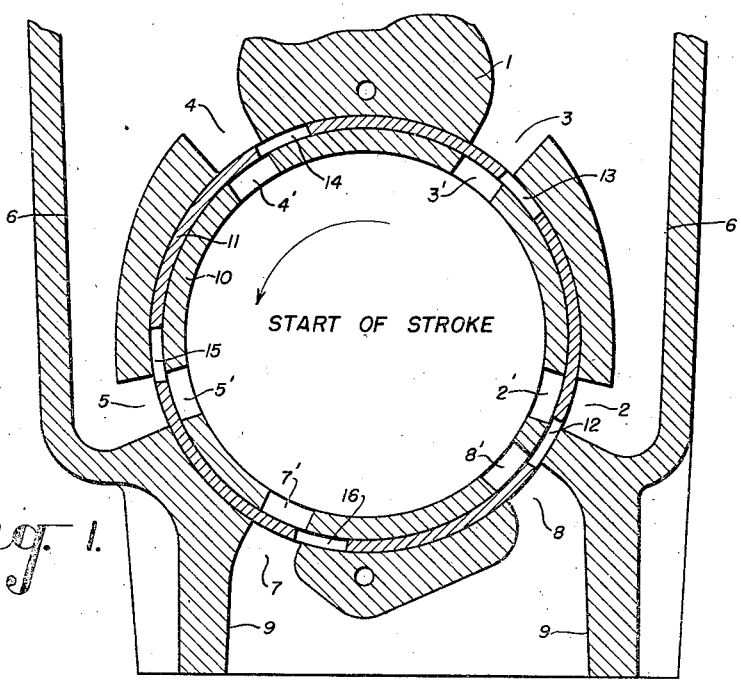
Figure 1 is a schematic view of a fragmentary portion of the engine showing in cross section the intake and exhaust ports and manifolds and the rotary sleeve valve in their respective positions at the start of the stroke taken along line I—I of Fig. 6.

Referring more particularly to the drawings, the engine includes a cylinder I with intake ports 2, 3, 4 and 5 leading into an intake manifold 6 and exhaust ports 7 and 8 leading into an exhaust manifold 9. The stationary inner sleeve 10 has ports 2', 3', 4', 5', 7' and 8' in alignment with ports 2, 3, 4, 5, 7 and 8. Intermediate the cylinder I and the inner stationary sleeve 10 is a rotary sleeve valve 11 having ports 12, 13, 14, 15 and 16 of the same size each as the cylinder and stationary sleeve ports. This arrangement provides for four intake ports leading into the cylinder from the intake manifold and two exhaust ports leading from the cylinder to the exhaust manifold.

Figure 2:
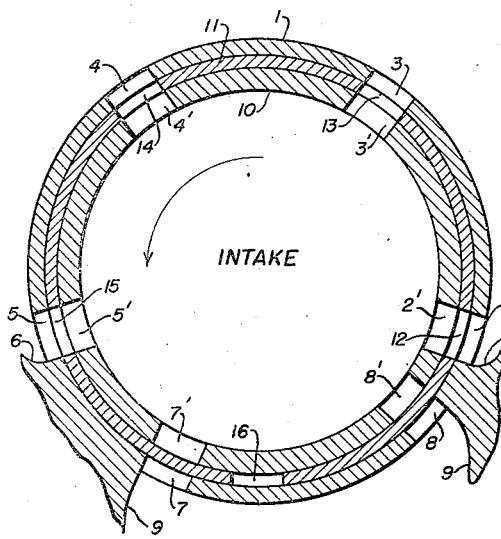
Figure 2 is a similar view taken during the intake stroke.

The rotary sleeve valve 11, however, is provided with five ports 12 to 16, inclusive. The relative positions of the rotary sleeve valve and its ports with respect to those of the cylinder and stationary sleeve during the intake stroke is shown in Figure 2. Here valve port 12 is in full registry with intake ports 2 and 2', valve port 13 with ports 3 and 3', valve port 14 with ports 4 and 4' and valve port 15 with ports 5 and 5'. It will be noted that valve port 16 is between exhaust 7, 7' and 8, 8' which exhaust ports are closed by the rotary sleeve valve.

Figure 3:
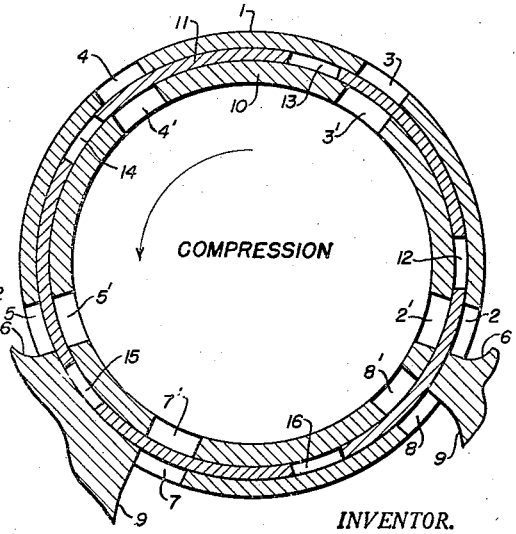
Figure 3 is a similar view taken during the compression stroke.

The rotation of the rotary sleeve valve is in a counterclockwise direction so that during the compression stroke of the engine, as shown in Figure 3, the intake as well as the exhaust ports are all closed by the rotary sleeve valve. Valve port 12 is between cylinder intake ports 2 and 3, valve port 13 between intake ports 3 and 4, valve port 14 between intake ports 4 and 5, valve port 15 between intake port 5 and exhaust port 7 and valve port 16 between exhaust ports 7 and 8.

Figure 4:
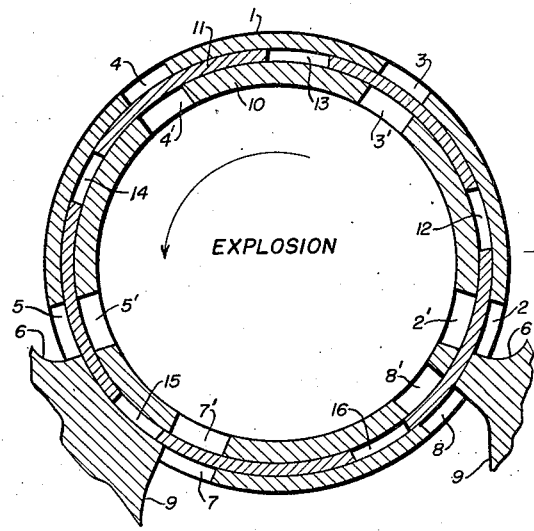
Figure 4 is a similar view taken during the explosion stroke.

As shown in Figure 4, during the explosion stroke the rotary sleeve valve has moved to a position where all of the intake and exhaust ports still remain closed and the valve ports still located between the respective cylinder ports as mentioned in connection with Figure 3 but moved further in a counterclockwise direction.

Figure 5:
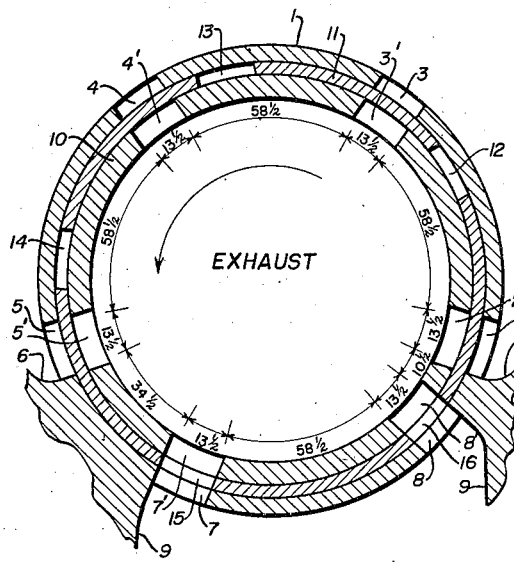
Figure 5 is a similar view taken during the exhaust stroke.
Figure 6:
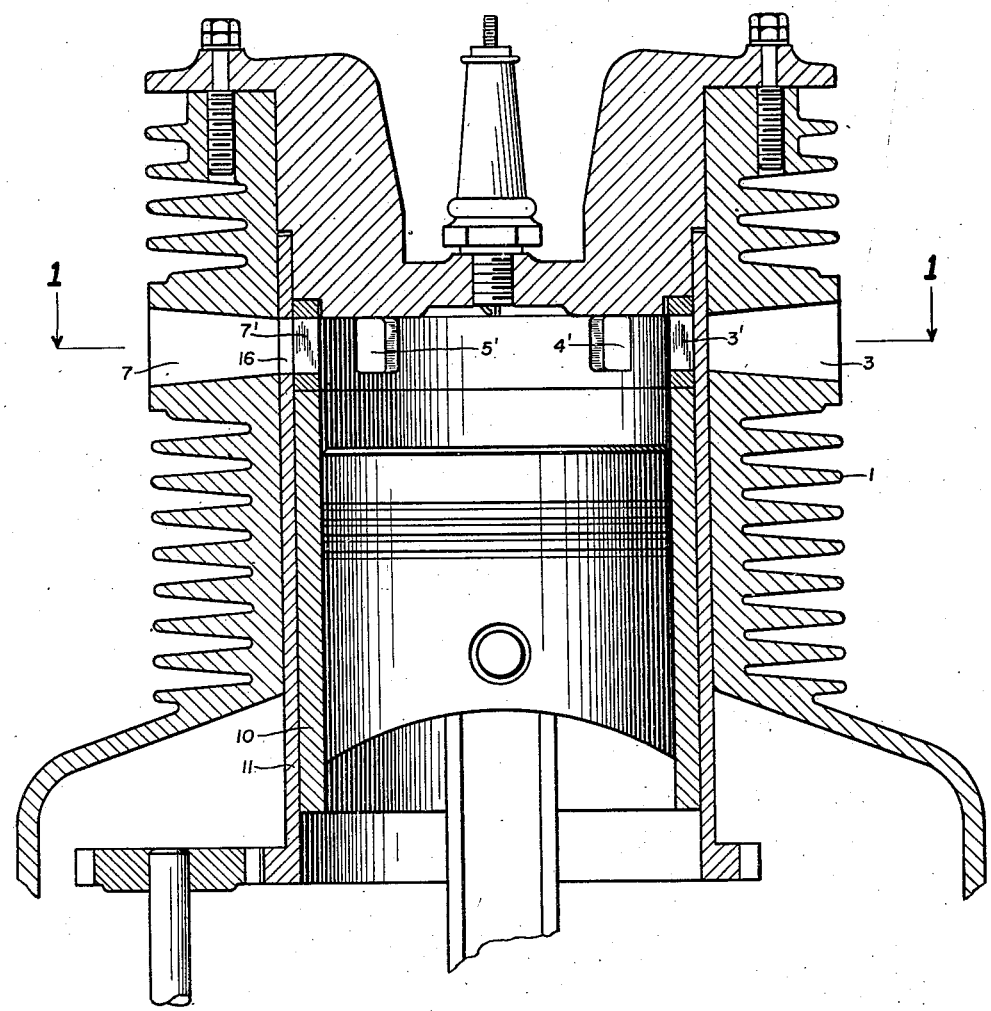
Figure 6 is a fragmentary view of the internal combustion engine in longitudinal and axial elevational section.

During the exhaust stroke, as shown in Figure 5, the rotary sleeve valve ports 15 and 16 have come into full registry with cylinder exhaust ports 7 and 8 and the corresponding inner sleeve ports 7' and 8'. The sleeve valve in this position still maintains the intake ports 2, 3, 4 and 5 closed. The valve port 12 is between intake ports 2 and 3, valve port 13 between intake ports 3 and 4 and valve port 14 between intake ports 4 and 5.

The cycle of operation just described for the intake, compression, explosion and exhaust strokes involves the following degrees of a 360° rotation of the rotary sleeve valve: for intake, 27°, for compression 10.5°, for explosion, 10.5° and for exhaust 27°. This makes a total of 75°, which calls for a total of 3° overlap for each valve port. The rotary sleeve valve makes one complete revolution for each five complete cycles of the four cycle engine, the cycle of operation of which has been above described.

This may be best understood by reference to Figure 1, which represents a step in the operation of the sleeve valve intermediate the exhaust stroke, as shown in Figure 5, and the intake stroke, as shown in Figure 2. Figure 1 shows the intake ports 2, 3, 4 and 5 and the exhaust ports 7 and 8 to be partially open. The sleeve valve port 12 is in partial registry with exhaust port 8 and intake port 2, valve port 13 with intake port 3, valve port 14 with intake 4, valve port 15 with intake port 5 and valve port 16 with exhaust port 7. This is the relationship that exists between the valve ports and the intake and exhaust ports at the start of the stroke. One and one-half degrees of this 3° overlapping of the valve ports occurs during the last stages of each exhaust stroke as valve ports 12, 16, 15, 14 and 13 respectively assume the position that valve port 12 does in Figure 1 in which it overlaps intake port 2 and exhaust port 8. The other one and one-half degrees of the 3° overlap continues during the initial stages of the intake stroke. Thus in view of the fact that the sleeve valve makes one revolution as the four cycle engine operates through five complete cycles, the above-described 3° overlap of each valve port totals 15° overlap during one fifth of one revolution of the sleeve valve and during one complete cycle of operation of the four cycle engine.

From the foregoing it will be seen that the six engine cylinder ports, including four intake ports and two exhaust ports, are controlled by a rotary sleeve valve having only five ports. While six cylinder ports have been shown and described, it is to be understood that any suitable number of cylinder ports may be used. The sleeve valve will have a lesser number of valve ports than the combined number of cylinder intake and exhaust ports, regardless of their number. The important feature is to have a relatively greater number of intake ports than exhaust ports so as to increase the efficiency of the explosive mixture charge in so far as the intake and exhaust ports and the valving means therefor is concerned. It is to be borne in mind that the rotary sleeve valve ports 12 to 16, inclusive, are equidistantly spaced throughout the 360° of the sleeve valve 11. It is during the exhaust stroke, and the latter part thereof, that the sleeve valve has moved from its position of having its ports 12 and 16 in full alignment with cylinder ports 8 and 7 (in the same manner as valve ports 16 and 15 are shown in registry with cylinder ports in Figure 5) to a position as shown in Figure 1 wherein 1½° of valve port 16 is in registry with exhaust port 7 and valve port 12 is in 1½° in registry with exhaust port 8 and and 1½° in registry with the intake port 4 and valve port 13 is 1½° in registry with intake port 5. This condition prevails, as shown in Figure 1, at the start of the stroke, or when the piston is at top dead center and of course is properly correlated with the engine timing.

As an example of measurement of the various ports and the distances therebetween with respect to 360° of a complete circle, and as shown in Figure 5, each of the sleeve valve ports 12 to 16 inclusive, and each of the cylinder ports 2 to 5, inclusive, 7 and 8 and 2' to 5' inclusive, 7' and 8' measure circumferentially 13½° each, the distance between intake ports 2 and 3, 3 and 4, 4 and 5 and exhaust 7 and 8 measures 58½°, the distance between intake port 5 and exhaust port 7 measures 34½° whereas the distance between exhaust port 8 and intake port measures 10½°.

The particular arrangement of the intake ports with respect to the exhaust ports, the fact that the number of intake ports, four in number, exceeds the number of exhaust ports, two in number, and the manner of valving them with the five port rotary sleeve valve predeterminedly correlated to the engine timing as described, all make for an increased efficiency in operation and in the provision and maintenance of a proper combustion charge in the cylinder explosion chamber. This is because of the greater ratio and proper distribution of the intake ports to assist in the expelling of exhaust gases during the exhaust stroke. Moreover, the overlap assists in the obtaining of a greater efficiency in the combustion charge. This is because during the greater portion of the exhaust stroke the inlet ports are closed and the exhaust ports opened by the sleeve valve. By the time that the four intake ports begin to open the pressure in the chamber above the piston has been largely dissipated and an accelerated flow established out through the two exhaust ports into the exhaust manifold. The charge is initiated from the intake manifold under pressure through the four intake ports the flow of whch is augmented by the accelerated flow of the exhaust gases through the exhaust ports so as to more nearly insure the complete discharge of the exhaust gases to increase the efficiency of the combustion charge during the intake stroke.

I claim:

1. In a rotary sleeve valve engine, an exhaust manifold and an intake manifold, a cylinder having a plurality of adjacent spaced exhausts ports leading to said exhaust manifold and a greater number of adjacent intake ports spaced equally as said exhaust ports and leading to said intake manifold, the intake ports adjacent the exhaust ports being unequally spaced and spaced a lesser distance than the intake ports and the exhaust ports, said valve having a plurality of circumferentially equidistantly spaced valve ports exceeding the number of intake ports and exceeding the number of exhaust ports but less in number than the combined number of intake and exhaust ports to permit said valve at one stage in the cycle of operation of said engine to open all of said intake ports while maintaining closed said exhaust ports, at another stage to open all of said exhaust ports while maintaining closed said intake ports and at another stage opening all of said intake and exhaust ports while progressively opening said intake while progressively closing said exhaust ports.

2. In a rotary sleeve valve engine, an exhaust manifold and an intake manifold, a cylinder having a plurality of adjacent spaced exhaust ports leading to said exhaust manifold and a greater number of adjacent intake ports spaced equally as said exhaust ports and leading to said intake manifold, the intake ports adjacent the exhaust ports being unequally spaced and spaced a lesser distance than the intake ports and the exhaust ports, said valve having a plurality of circumferentially equidistantly spaced valve ports exceeding the number of intake ports and exceeding the number of exhaust ports but less in number than the combined number of intake and exhaust ports to permit said valve at one stage in the cycle of operation of said engine to open all of said intake ports while maintaining closed said exhaust ports, at another stage to open all of said exhaust ports while maintaining closed said intake ports and at another stage opening all of said intake and exhaust ports while progressively opening said intake while progressively closing said exhaust ports during the latter stages of the exhaust stroke of said engine.

3. In a rotary sleeve valve engine, an exhaust manifold and an intake manifold, a cylinder having a plurality of adjacent spaced exhaust ports leading to said exhaust manifold and a greater number of adjacent intake ports spaced equally as said exhaust ports and leading to said intake manifold, the intake ports adjacent the exhaust ports being unequally spaced and spaced a lesser distance than the intake ports and the exhaust ports, said valve having a plurality of circumferentially equidistantly spaced valve ports exceeding the number of intake ports and exceeding the number of exhaust ports but less in number than the combined number of intake and exhaust ports to permit said valve at one stage in the cycle of operation of said engine to open all of said intake ports while maintaining closed said exhaust ports, at another stage to open all of said exhaust ports while maintaining closed said intake ports and at another stage opening all of said intake and exhaust ports while progressively opening said intake while progressively closing said exhaust ports during the latter stages of the exhaust stroke of said engine to be uniformly partially open at the top dead center position of the piston of the engine.

4. In a four cycle rotary sleeve valve engine, an intake and an exhaust manifold, a cylinder having four intake and two exhaust ports of equal size each embracing 13½° of the total 360° circumferentially, the four intake ports being adjacently spaced 58½° and leading to the intake manifold and the two exhaust ports being adjacent and spaced 58½° from each other and leading to the exhaust manifold, one of said exhaust ports being spaced 34½° from its adjacent intake port and the other exhaust port being spaced 10½° from its adjacent intake port, a rotary sleeve valve for regulating the opening and closing of said ports having five equidistantly spaced valve ports each of which embraces 13½° to be of a size equal to the cylinder ports.

5. In a four cycle rotary sleeve valve engine, an intake and an exhaust manifold, a cylinder having four intake and two exhaust ports of equal size each embracing 13½° of the total 360° circumferentially, the four intake ports being adjacently spaced 58½° and leading to the intake manifold and the two exhaust ports being adjacent and spaced 58½° from each other and leading to the exhaust manifold, one of said exhaust ports being spaced 34½° from its adjacent intake port and the other exhaust port being spaced 10½° from its adjacent intake port, a rotary sleeve valve for regulating the opening and closing of said ports having five equidistantly spaced valve ports each of which embraces 13½° to be of a size equal to the cylinder ports, said valve being so correlated to the cylinder ports and the timing of said engine as to make one revolution for each five complete cycles of operation of the engine.

6. In a four cycle rotary sleeve valve engine, an intake and an exhaust manifold, a cylinder having four intake and two exhaust ports of equal size each embracing 13½° of the total 360° circumferentially, the four intake ports being adjacently spaced 58½° and leading to the intake manifold and the two exhaust ports being adjacent and spaced 58½° from each other and leading to the exhaust manifold, one of said exhaust ports being spaced 34½° from its adjacent intake port and the other exhaust port being spaced 10½° from its adjacent intake port, a rotary sleeve valve for regulating the opening and closing of said ports having five equidistantly spaced valve ports each of which embraces 13½° to be of a size equal to the cylinder ports, said valve being so correlated to the cylinder ports and the timing of said engine as to make one revolution for each five complete cycles of operation of the engine and close all of said cylinder ports during the compression and explosion strokes and open said intake ports during the intake stroke and opening the exhaust ports during the exhaust stroke and during the last stages of said exhaust stroke progressively close said exhaust ports and open said intake ports to a point at top dead center when each port is open 1½°.

RALPH M. HEINTZ.